United States Patent [19]
Huddleston et al.

[11] Patent Number: 6,033,776
[45] Date of Patent: Mar. 7, 2000

[54] HIGH SHEAR PIPELINE TAPE

[75] Inventors: Elwyn G. Huddleston, Brentwood, Tenn.; Scott C. Barnes; Rosana Bianchini, both of Renfrew, Canada

[73] Assignee: Scapa Tapes North America, Renfrew, Canada

[21] Appl. No.: 09/136,937

[22] Filed: Aug. 20, 1998

Related U.S. Application Data

[63] Continuation-in-part of application No. 08/859,189, May 20, 1997, Pat. No. 5,817,413.

[51] Int. Cl.⁷ .............................. B32B 7/12; B32B 25/04
[52] U.S. Cl. .................................. 428/355 BL; 428/356; 428/36.8; 138/144; 138/DIG. 1; 138/DIG. 6
[58] Field of Search ............................ 428/355 BL, 356, 428/343, 36.8, 36.91; 138/144, DIG. 1, DIG. 6; 526/340

[56] References Cited

U.S. PATENT DOCUMENTS

| | | | |
|---|---|---|---|
| 4,472,231 | 9/1984 | Jenkins | 156/307.5 |
| 4,692,352 | 9/1987 | Huddleston | 427/208.4 |
| 4,742,119 | 5/1988 | Close | 525/211 |
| 4,797,322 | 1/1989 | Huddleston et al. | 428/355 |
| 4,933,235 | 6/1990 | Kellner | 428/355 |
| 4,946,529 | 8/1990 | Huddleston | 156/187 |
| 5,095,068 | 3/1992 | Chiu | 524/525 |
| 5,108,809 | 4/1992 | Patil et al. | 428/35.8 |
| 5,242,727 | 9/1993 | Briddell et al. | 428/42 |
| 5,817,413 | 10/1998 | Huddleston et al. | 428/356 |

*Primary Examiner*—Daniel Zirker
*Attorney, Agent, or Firm*—Alvin Isaacs

[57] ABSTRACT

A high shear adhesive tape having an adhesive layer containing a rubber mix and at least one tackifying resin, the rubber mix including an effective amount of a styrenic block copolymer or terpolymer, the adhesive layer further being characterized as being free of any crosslinking agent for rubber in the mix; and pipewrap systems employing this tape. In a particularly preferred embodiment, the rubber mix also includes crosslinked halogenated butyl rubber.

21 Claims, No Drawings

HIGH SHEAR PIPELINE TAPE

RELATED APPLICATION

This application is a continuation-in-part of our application Ser. No. 08/859189, filed May 20, 1997 and now U.S. Pat. No. 5,817,413.

BACKGROUND OF THE INVENTION

Metal pipelines intended for implantation in the ground require protection from corrosion and other degradative environmental forces. Consequently, the patent literature is replete with references to various types of coatings and tapes for protecting these pipelines.

One such protective system which has achieved great commercial success utilizes the combination of a rubber-based primer coating applied to the outer surface of the metal pipe and then overwrapped with an adhesive tape comprising a rubber-based adhesive carried on the inner surface of a backing material, most preferably an impact-resistant material resisting damage from falling rocks and the like.

The present invention is directed to providing an adhesive tape having improved resistance to shear and hence referred to hereinafter as a "high shear" adhesive tape.

As known in the art and well described, for example, in U.S. Pat. No. 4,472,231 issued to Robert F. Jenkins, anti-corrosion protective adhesive tapes ("pipewraps") that are applied to inground pipeline structures are often subjected to rather severe long-term shearing forces derived from the surrounding soil. The magnitude of these shearing forces depends upon several factors, including: (1) the type of soil; (2) the tectonic forces surrounding the implanted pipeline; (3) the diameter of the pipe; (4) the axial site emplacement; and (5) the range of thermal expansion of the pipe as well as its contents.

As is known, frictional forces acting between the pipewrap and the surrounding soil are the primary source of shear stress. These frictional forces are here defined as the product of the frictional coefficient between the outer surface of the pipewrap and the soil and the normal force acting around the pipe. Since the coefficient of friction depends upon both the nature of the outer surface of the protective pipewrap as well as the surrounding soil, it will be understood to vary in different usages.

Other factors having importance in these considerations are the weight of the soil above the pipe, as well as the weight of the pipe, including its contents. In addition, since the normal force will vary depending on the axial position around the pipe diameter, the frictional force and hence the shearing force will also be found to vary around the diameter of the pipe.

The result of long-term shear forces on the pipewrap system is referred to as "soil stress". Soil stress on anti-corrosion protective pipewraps generally results from the structural shear forces which cause the pipewrap to creep along the pipeline peripheral surface.

Creep is, in essence, a long-term visco-elastic, or "cold-flow" phenomenon, common to all polymeric substances. The amount of creep, however, will depend upon the physical properties of the pipewrap's adhesive coating. Since these physical properties (i.e. modulus) will be temperature dependent, temperature becomes a decisive element in determining the amount of creep. At low temperatures, the propensity of the pipewrap to creep will be substantially reduced, while at elevated temperatures the likelihood of creep will be significantly increased, other factors remaining the same.

The aforementioned Jenkins U.S. Pat. No. 4,472,231 is directed to providing a pipewrap system providing increased shear resistance, i.e. a high shear pipewrap or adhesive tape. The starting point of the Jenkins inventive concept is thought to reside in the statement in the patent system to the effect that when a rubber-based adhesive system is crosslinked, (1) the resistance to creep is increased; (2) the overall dimensional stability is improved; and (3) it is more resistant to heat distortion. These crosslinking effects are said to be generally intensified as the crosslink density is increased and can therefore be controlled by adjusting the number of crosslinks in the adhesive coating.

The Jenkins invention as described and claimed in the patent is a specified crosslinking system which comprises the combination of a particular primer coating applied to the outer surface of the metal pipe and a particular overlying rubber-based adhesive tape. Specifically, the primer coating comprises a blend of natural rubber, resins and a lead oxide crosslinking activator coated with organotitanate prior to incorporation in the primer coating; and the adhesive tape comprises a polyolefin backing material carrying a blend of virgin butyl rubber and reclaimed butyl rubber and which is initially partially crosslinked with p-quinone dioxime crosslinking agent, a tackifier, and a residual amount of unreacted p-quinone dioxime crosslinking agent.

In the claimed system, it is stated that when the pipe is placed in the ground, in situ crosslinking occurs at the primer-adhesive surface as well as throughout the primer layer and the adhesive layer in the presence of the elevated temperature of the pipeline and its contents.

However, as stated in U.S. Pat. No. 4,946,529 issued to Elwyn G. Huddleston (one of the instant joint applicants) and assigned to The Kendall Company, assignee of the Jenkins patent as well:

"It will be noted that the two-component system of Jenkins relies upon what the patentee describes in essence as a high speed additional crosslinking obtained by employing p-quinone dioxime as cross-linker and metal oxide, preferably lead dioxide, activator surface-treated with organo-titanate. The increased speed obtained thereby was thought to be critical to the solution of the task of the invention.

"While the patented system was entirely satisfactory in small-scale manufacture of an anti-corrosion pipewrap system, it nevertheless suffered from certain deficiencies making it impractical in the larger scale commercial manufacture of the system.

"Specifically, it has been found that the operating conditions taught in U.S. Pat. No. 4,472,231 do not provide a procedure which is processable in a Banbury mixer in commercial production of the adhesive. Repeated attempts to implement the teachings of the '231 patent on production equipment immediately resulted in lumpy adhesive."

Accordingly, it was specifically acknowledged in a commonly assigned patent application that the invention described in the Jenkins patent failed to provide a high shear tape for commercial production.

Since a high shear tape which was capable of commercial manufacture was still desired, subsequent research and development at The Kendall Company to solve the lumping problem in the Jenkins system then resulted in two inventions by the aforementioned Elwyn G. Huddleston.

The first filed of these two Huddleston inventions, which issued as U.S. Pat. No. 4,946,529, solved the problem by providing a system in which no crosslinking occurs in the Banbury. Instead, the initial crosslinking required to provide an adhesive tape is obtained by employing in the Banbury mix a commercially available pre-crosslinked butyl ("Kalar", trademark of Hardman, Inc.). In other words, the rubber components to be admixed with the tackifier and other ingredients in the Banbury to form the "premix" will consist of partially pre-crosslinked virgin butyl and a non-crosslinked virgin butyl rubber. Optionally, a portion of the virgin butyl may be, and preferably will be replaced by reclaimed butyl rubber, in which event the premix will contain a blend of partially crosslinked virgin sbutyl, non-crosslinked virgin butyl and reclaimed butyl rubber. The resulting premix will be effectively free of any crosslinking agent other than any inconsequential trace amounts of unreacted crosslinker that may be contained in the rubbers.

In any case, it is stated that the degree of partial crosslinking of the butyl rubber prior to mixing with the other components in the Banbury to form the premix dispersion may vary within a wide range to provide a coatable rubber-based adhesive formulation. It may, for example, be on the order of 35 to 75%.

It is next stated in the patent that, in general, the proportions of partially crosslinked rubber in the total rubber blend will vary inversely to the percentage of crosslinking, i.e., the greater the percentage of crosslinking within the above-noted 35–75% range, the lesser the amount of pre-crosslinked rubber is to be in the premix. While the determination of the precise amounts which may be desired for optimum results will be within the expected judgment of the skilled worker, it may be said that the amount of partially crosslinked rubber to be employed in the premix will be on the order of from about 8 to about 48%, depending upon the degree of crosslinking, the remainder being virgin butyl and reclaimed rubber.

By way of further illustration, it is then recited that when a 55% pre-crosslinked butyl is employed, it has been found that the amount of this pre-crosslinked butyl should be on the order of from about 13 to about 30% by weight of the total rubber blend. In other words, the rubber blend in the premix should comprise from about 13 to about 30% by weight of 55% pre-crosslinked butyl.

In a separate mixing step, the premix as described above is then admixed with an effective amount of a crosslinking agent necessary for the inground in situ crosslinking of the primer, primer-adhesive interface and the further crosslinking of the adhesive coating itself, in accordance with the teachings of the aforementioned Jenkins patent. Without the addition of crosslinking agent for inground in situ crosslinking, there is not enough crosslinked rubber present in the adhesive to obtain the desired shear resistance.

In the paragraph bridging Cols. 8 and 9, it is reported that the Huddleston system gave "comparable satisfactory protection, including creep resistance, to the Jenkins '231 system. Specifically, after 48 hours conditioning [above the ground] at 85° C. [185° F.] the shear rate will not exceed 10—$^8$ meters/second. It is to be noted however that the force exerted is not defined in either the Huddleston or the Jenkins patent.

While the Huddleston '529 system does in fact achieve improved resistance to creep and has enjoyed substantial commercial success for many years now, and still does, it nevertheless suffers from certain deficiencies. The most significant of these deficiencies is that it requires in situ crosslinking on the pipe and the heat required for this in situ crosslinking may not in fact be available. Even on hot gas lines, many weeks or months may pass before the line is so heated.

Moreover, with the passing years, due to changes in the temperature and the flow of liquids and gases through inground pipelines there is now a need for still greater shear resistance than what existed at the time of the Huddleston invention that resulted in his '529 patent.

Referring back to Jenkins, it is stated in Col. 2 that adhesive resistance to flow or creep is improved by introducing crosslinks between the component rubber chains. It is also stated that the "crosslinking effects are generally intensified as the crosslink density is increased, and can therefore be controlled by adjusting the number of crosslinks in the adhesive coating.

With this in mind, attention is now invited back to the Huddleston patent.

In discussing the ranges of pre-crosslinked butyl that may be employed (Col. 6 of the patent), it is stated that "the degree of partial crosslinking of the butyl rubber . . . may vary within a wide range to prove [sic] a coatable rubber-based adhesive composition" (emphasis added). ["prove" is obviously a typographical error. It is thought clear that "provide" was intended.]

In other words, while not explicitly stated in the patent, it is implicitly clear that the constraints on the amounts of crosslinked butyl in the adhesive are due to the ability to coat the product. If the adhesive is too viscous due to excessive crosslinking, it will not be "coatable" to provide a tape.

Accordingly, a need existed to provide a pipewrap carrying a rubber-based adhesive layer which has more than 13–30% by weight of the total blend mixture crosslinked 55%, i.e. with a maximum of about 16.5% of its crosslinkable sites crosslinked, as taught in the '529 patent and still not be so viscous as not to be coatable on a tape backing.

Secondly, the in situ crosslinking required by the Jenkins system requires heat in the ground. Lord Chemical Co., supplier of p-quinone dioxime crosslinker states that the minimum activation temperature for this to occur is around 165° F. However, many if not most pipelines never reach that temperature. Even assuming arguendo that they eventually did achieve that temperature, there would still be a time lag in the added crosslinking protection by the contemplated in situ crosslinking which is necessary to provide the desired shear resistance. This time lag before the pipeline is fully protected by the overlying pipewrap may be weeks or even months in the ground at a temperature between ground temperature and the 165° F. minimum activation temperature. During this time lag, the previously mentioned sheer forces are working on the pipe coating.

While the manufacturing constraints in a commercial system are of course of lesser concern than the performance of the product, it will nevertheless be readily understood that anything that contributes to the cost of manufacture is always of concern and, consequently, very significant improvement for the manufacturer and supplier of the product will then lie in a more cost-efficient method of manufacture of an otherwise similar product in terms of performance by the end user.

In addition to the purchase and storage of the "conventional" or non-crosslinked butyl, a source of supply must be found for the pre-crosslinked butyl, the cost of which, incidentally, is very high; or, alternatively it must be manufactured in house for use in the adhesive premix. Secondly, additional warehouse storage is required for the pre-crosslinked butyl. Next, a separate manufacturing step is required downstream from the Banbury premix in order to add the crosslinker required for the in ground crosslinking. Finally, crosslinker and activator must be present at this downstream step. As will be appreciated with anyone familiar with plant manufacture, it would be most desirable for any or all of these criteria to be obviated.

The second of the two Huddleston inventions alluded to above was the subject matter of Ser. No. 843,943 filed Mar. 25, 1986 and now abandoned. However, although abandoned, the subject matter is disclosed in Col. 4 of U.S. Pat. No. 4,692,352 of Huddleston. As disclosed therein, the '943 application relates to an alternate approach to solving the problem with the Jenkins system wherein the partially crosslinked premix is provided by crosslinking in the Banbury with a phenolic resin crosslinking agent in lieu of the p-quinone dioxime of Jenkins. It is disclosed that "the premix will comprise a mixture of virgin butyl rubber and/or halogenated butyl rubber alone or in combination with reclaimed rubber, the virgin and/or halogenated butyl rubber being partially crosslinked by the phenolic resin crosslinking agent.

The last-mentioned patent application suffers from some of the same deficiencies previously mentioned. Specifically, shear resistance will not be provided until the inground temperature of at least 165° F. required for in situ crosslinking is reached. As heretofore noted, this may not in fact occur. Even if it does, there will be a time lag in the protection to the pipe both above ground and after inground implantation until this temperature is reached.

The foregoing detailed discussion, which Applicants consider necessary for a full comprehension of the nature and objects of the present invention, constitutes all of the prior art known to Applicants relating to high shear rubber-based tapes at the time of the invention described and claimed in the aforementioned copending application, Ser. No. 08/859, 189 (hereinafter "the parent case"), of which the present application is a continuation-in-part. It will of course be understood that further art not presently known to Applicants may in fact exist.

THE INVENTION OF THE PARENT APPLICATION

Stated simply, the task of the invention in the parent case was to provide a high shear pipewrap system obviating all of the deficiencies in the above-mentioned systems and which, most significantly, would provide optimum creep resistance for modern day pipelines.

As is disclosed in the parent case, this task is solved in an elegant and cost-effective manner by including in the rubber component of the adhesive an amount of crosslinked halogenated butyl rubber effective to provide a predetermined desired improvement in shear resistance, as will be discussed in more detail hereinafter. In other words, the rubber employed in the adhesive will contain crosslinked halogenated butyl rubber as well as the other rubbers generally employed in pipewraps, e.g. butyl rubber. However, unlike the systems previously described directed to a high shear tape, in the practice of the present invention, the halogenated butyl is the only rubber in the mix which is required to be crosslinked.

Preferably the crosslinking of the halogenated butyl rubber will take place in the Banbury or other mixer employed in the manufacture of the adhesive, in which case the mix will also contain a crosslinking agent specific to the halo substituent so that the halogenated butyl is crosslinked in the presence of the crosslinking agent to the exclusion of the other rubber components.

Preferably, the rubber mixture will consist of about 30% halogenated butyl based on the total weight of rubber in the mixture, the remaining 70% of the rubber being butyl rubber and, most preferably, a blend of virgin butyl and reclaimed butyl rubber.

An important feature of the invention in the parent case is that only the halogenated butyl need be crosslinked and that all crosslinking that is required to protect the pipe is provided by the time the rubber mix leaves the Banbury. When an adhesive tape having a backing containing an adhesive layer including this rubber mix along with the other ingredients in the adhesive is wound over the primer-coated pipe, the pipe is then provided with the maximum protection the system is capable of providing and this occurs before inground plantation.

To recapitulate, while various systems for protecting pipes in the ground against corrosion and other degradative forces have enjoyed commercial use as well as being reported in the patent literature, the invention of the parent case, like the inventions previously described, is directed particularly to those systems wherein the pipe surface is first coated with a liquid rubber-based primer and thereafter a rubber-based adhesive tape (a so-called "pipewrap") is spirally wrapped in overlapped relationship over the thus applied primer coating.

The starting point for the parent case invention comprises a rubber-based adhesive carried on a backing of the type well known in the art for protecting inground pipes. In general these tapes consist of a sheet material, preferably an impact-resistant material such as polyethylene or polypropylene carrying on one surface thereof an adhesive layer consisting of one or more rubbers and at least one tackifying agent providing the desired adhesiveness to the rubber mix. Typically, the rubber component will comprise butyl rubber and most preferably the butyl rubber will consist of a mixture of virgin butyl rubber and reclaimed butyl rubber. These are the essential ingredients of the adhesive layer for these pipewraps. Of course, the adhesive layer may and preferably will contain other reagents performing specific desired functions.

As previously alluded to, the adhesive layer of the pipewrap will contain, in addition to the other rubber materials, an effective amount of crosslinked halogenated butyl rubber. As used therein, the term "effective amount" means an amount effective to provide increased resistance to shear of on the order of at least 100% more than would be obtainable if the rubber mix did not contain the crosslinked halogenated butyl, the other components being non-crosslinked rubbers.

While defining the amount of halogenated butyl to be employed by the recitation of "effective amount" is thought to be the most specific way to define the limitation of the amounts to be present, it has been found that amounts of crosslinked halogenated butyl up to 45% by weight, based upon the total weight of rubber in the adhesive are contemplated as being useful, 30% by weight of crosslinked halogenated butyl being most preferred.

As will be readily understood by those skilled in the art, the upper limits of the amount of halogenated butyl to be employed will be governed by two factors: (1) since the viscosity of the adhesive mix will increase directly proportional to the increase in crosslinks, obviously the mix should not be too viscous for further processing, namely coating onto the backing; and (2) from the economic standpoint inherent in all commercial manufacture, it should not exceed the point where no further advantage is obtained by the increase.

Useful halogenated butyls will include those known in the art and commercially available, namely the known chlorobutyls and bromobutyls.

While it is conceived that one may possibly start with "pre-crosslinked halogenated butyl", it is preferred that the crosslinking occur in the Banbury or other internal mixer containing the other ingredients of the adhesive. However, since it is only necessary in the practice of this invention that the halogenated butyl be crosslinked, the crosslinking agent included in the Banbury rubber mix will be a crosslinker specific to the halo substituent(s) of the halogenated butyl rubber. This is simply because no crosslinking of the other rubbers in the rubber mix is contemplated or desired, either before inground implantation of the pipe or after the pipe is in the ground. The preferred crosslinker for this purpose is zinc oxide.

The preferred rubber for the rubber mix in addition to the crosslinked halogenated butyl is butyl rubber, preferably a mixture of virgin butyl and reclaimed butyl rubber.

The only other essential ingredient for the adhesive is that it contain one or more tackfying resins providing the requisite adhesiveness to the coating. The particular tackifier(s) to be employed will be a matter of individual choice within the expected judgment of the skilled worker. They may be selected from a long list including: rosins such as gum, wood, or tall oil rosin; modified rosins, e.g. polymerized rosin or hydrogenated rosin; rosin esters such as pentaerythritol-wood rosin, glycerine-hydrogenated rosin, glycerine-highly stabilized rosin, and a pentaerythritol-highly stabilized rosin; polymerized petroleum hydrocarbons, e.g. cycloaliphatic hydrogenated olefins, olefins, aliphatic hydrocarbons, modified aromatic hydrocarbons, dicyclopentadiene, mixed olefins, alkyl-aromatic petroleum hydrocarbons, modified aromatic hydrocarbons; polymerized terpenes such as α-pinene, d-limonene, β-pinene, terpene, etc.; miscellaneous resins such as α-methyl styrene-vinyl toluene, α-methyl styrene, terpene phenolic, courmarone-indenes, and the like.

While the foregoing constitutes the essential ingredients, it is to be expressly understood that the adhesives of this invention may additionally contain other reagents performing specific desired functions, e.g. antioxidants, bactericides, fillers, pigments, plasticizers, etc.

The tapes may possess thicknesses comparable to those of the prior art. For example, the backing, preferably a polyolefin such as polyethylene characterized as being impact-resistant, may be on the order of 5–30 mils thick, most preferably on the order of 8–15 mils thick; while the adhesive layer contained on one surface of the backing may also be on the order of 5–30 mils thick, most preferably on the order of 7–21 mils thick.

Analytical test data disclosed in the parent case clearly and unequivocally showed that the test tape of the parent case invention was superior to the Polyken high shear tape at both ambient and elevated temperatures.

While the aforementioned invention of the parent case constitutes a very substantial improvement in the art and would for this reason enjoy significant commercial success, the inventors continued their research and development to determine if the shear resistance of the tapes described and claimed in the parent case could be improved still further.

This continued research constitutes the task of this invention, namely to provide a high shear adhesive tape for pipelines having improved resistance to shear over the tapes of their copending application Ser. No. 08/859,189, now U.S. Pat. No. 5,817,413.

BRIEF DESCRIPTION OF THE INVENTION

In accordance with the present invention, this task is solved in an elegant manner by including in the rubber mix an effective amount of a block polymer elastomer, e.g. a per se known styrenic block copolymer or terpolymer.

DETAILED DESCRIPTION OF THE INVENTION

As heretofore mentioned, the present invention is directed to the task of providing a high shear pipewrap system obviating the deficiencies in the aforementioned prior art systems and which, most significantly, provides optimum creep resistance for modern day pipelines.

The starting point of the present invention cannot be said to be the high shear systems in the prior art, such as those in the patent literature, but instead is the invention of the parent case, as was discussed in the BACKGROUND of the instant application.

According to the present invention, the task is solved by incorporating in the rubber mix of the parent case an effective amount of a block polymer elastomer, e.g. a styrenic block copolymer or terpolymer. These block polymers melt at temperatures on the order of 200° F. or greater, at which temperature they begin to act as a plasticizer. Consequently, the rubber mix will possess decreased viscosity at these temperatures or greater and can be calendered easily, thereby permitting the rubber mix to have increased crosslinks and still be calendered onto the tape backing. When the temperature cools down after calendering, the block polymer forms long, tangled molecular chains which cause high resistance to distortion at all temperatures below 200° F.

The amount or percentage of block polymer in the rubber mix in accordance with this invention is not capable of precise quantification. One skilled in the art will readily appreciate it may depend, at least in part, on the block polymer selected, the amounts of the other components of the rubber mix, as the degree of crosslink density in the rubber mix and it will also depend at least in part on the degree of improvement desired over the same rubber mix without the block polymer. Accordingly, the amount of block polymer to be used in the practice of this invention will hereinafter in the description and in the appended claims be defined as an effective amount, "effective amount" being defined as the amount required to produce a detectable improvement in shear resistance over the same rubber mix without the block polymer of this invention.

The block polymers which may be employed in the practice of this invention may be any of those heretofore known in the art, e.g. those of the Vector® series commercially available from Exxon and those of the Kraton® series commercially available from Shell Chemical Company. (Similar materials are also commercially available from foreign companies.) Particularly useful classes of block polymers are the radial blocks such as $(SI)_4$ or $(SB)_4$; the styrene-isoprene-styrene (SIS); the styrene-butadiene-styrene (SBS); and the styrene-ethylene-butylene-styrene (SEBS) blocks. Illustrative species of this description include the following:

| Class | Polymer | Styrene/Rubber ratio |
| --- | --- | --- |
| SIS (linear) | Vector 4111 | 18/82 |
| SIS (18% SI diblock) | Vector 4113 | 15/85 |
| SIS (42% ") | Vector 4114 | 15/85 |
| SIS (25% ") | Vector 4213-D | 25/75 |
| SIS (linear) | Vector 4211 | 30/70 |
| SIS | Vector 4411 | 44/56 |
| SBS | Vector 8508 | 29/71 |
| SBS | Vector 6241-D | 43/57 |
| SBS | Vector 2518 | 30/70 |

-continued

| Class | Polymer | Styrene/Rubber ratio |
|---|---|---|
| (SB)$_n$ (<20% diblock) | Vector 2411 | 30/70 |
| SIS | Kraton D-1107 | 15/85 |
| SIS | Kraton D-1111 | 22/78 |
| SIS | Kraton D-1112 | 15/85 |
| SIS | Kraton D-1117 | 17/83 |
| SIS | Kraton D-1125X | 30/70 |
| SBS | Kraton D-1101 | 31/69 |
| SBS | Kraton D-1102 | 28/72 |
| SBS (branched) | Kraton D-1116 | 21/79 |
| SBS " | Kraton D-1122X | 37/63 |
| SEBS (linear) | Kraton G-1652 | 29/71 |
| SEBS | Kraton G-1654X | 31/69 |
| SEBS | Kraton G-1657 | 13/87 |
| SEBS | Kraton G-1726X | 30/70 |
| $^1$(SI)$_4$ radial | Vector DPX-551 | S = 19.5–21.5 |
| $^2$(SI)$_4$ " | Vector DPX-586 | S = 21 |
| $^3$(SI)$_4$ " | Vector DPX-552 | S = 28–32 |
| $^4$(SB)$_4$ " | Vector DPX-555 | S = 38–44 |

1 Diblock Content = 25–35%
2. " = 15%
3. " = 15–25%
4. "= —

While it will be appreciated that Applicants have not tested all available block polymers, they are not aware of any that will not provide the beneficial results in terms of increased shear obtainable by the practice of this invention. Nevertheless, it will be appreciated that it is entirely possible that not all elastomers may not be operative in the practice of this invention, it is to be expressly understood that only those which are so operative are within the scope of the appended claim, to the exclusion of any block elastomers which are not.

As heretofore noted, since the amounts of block elastomers which may be employed are not capable of precise quantification, in its broadest aspect the amount has been defined meaningfully as an "effective amount", meaning an amount effective to produce a detectable improvement in shear resistance.

However, by way of illustration, the amount of block elastomer may be on the order of from about 15% to about 40 percent by weight, based on the total weight of rubber in the adhesive layer. Illustrative formulations will include from about 20% to about 45% by weight of crosslinked halogenated butyl rubber; from about 35% to about 70% by weight of non-crosslinked butyl or other rubber, and from about 10% by weight to about 40% by weight of the elastomeric block polymer of this invention, based upon the total weight of rubber in the formulation.

The following examples show by way of illustration and not by way of limitation the practice of this invention.

EXAMPLE 1

Banbury Formulation

| Charge # | Description | Weight (lbs) |
|---|---|---|
| 1 | Butyl reclaim | 52.00 |
| 1 | Butyl virgin | 26.00 |
| 1 | Vector DPX-552 radial block (SI)$_4$ | 26.00 |
| 1 | Agerite Stalite S | 1.00 |
| 1 | Irganox B215 | 1.00 |
| 1 | Salicylanilide | 0.04 |
| 2 | Clay filler | 90.00 |
| 2 | Endex 155 (end block resin) | 8.00 |
| 3 | Indopol H-100 (polybutene tackifier) | 10.00 |
| 4 | Indopol H-100 | 10.00 |

Mill Mix

| | | |
|---|---|---|
| Banbury mix (from above) | | 224.04 |
| Escorez 1102/Piccopale 100 tackifier | | 43.00 |

The conditions for the mixing in the Banbury were set as follows:

Ram: 90 psi
Coolant 115° F.
The four charge mix was made as follows:

| | | |
|---|---|---|
| Charge 1 Mix | 2 minutes (235–240° F.); | Rotor speed: 60 RPM |
| Charge 2 Mix | 1 minute (330–335° F.); | Rotor speed: 105 RPM |
| Charge 3 Mix | 1 minute (310–315° F.); | Rotor speed: 75 RPM |
| Charge 4 Mix | to 340° F. minimum; | Rotor speed: 60 RPM |

The resulting Banbury formulation was then milled on a two-roll mill with the mill mix materials, after which the adhesive mix from milling was calendered onto a 9.0 mil thick polyethylene backing to provide an adhesive layer 7.0 mils thick. The resulting tape was marked for identification as X-97046.

EXAMPLE 2

Banbury Formulation

| Charge # | Description | Weight (lbs) |
|---|---|---|
| 1 | Chlorobutyl 1066 (Exxon) | 27.00 |
| 1 | Butyl reclaim | 18.00 |
| 1 | Butyl virgin | 18.00 |
| 1 | Vector DPX 552 radial block (SI)$_4$ | 27.00 |
| 1 | Irganox B215 | 0.50 |
| 1 | Agerite Stalite S | 1.20 |
| 1 | Salicylanilide | 0.04 |
| 2 | Wood rosin | 4.50 |
| 2 | Clay filler | 13.00 |
| 2 | Zinc oxide | 9.00 |
| 2 | Endex 155 | 10.00 |
| 3 | Indopol H-100 | 18.00 |
| 3 | Escorez 1102/Piccopale 100 | 3.00 |
| 3 | Clay filler | 60.00 |

Mill Mix

| | |
|---|---|
| Banbury mix (from above) | 209.24 |
| Escorez 1102/Piccopale 100 | 50.00 |
| Limestone | 10.00 |

The conditions for the Banbury mix were set as follows:

Ram 90 psi
Coolant 115° F.
The three-charge mix was made as follows:

| | | |
|---|---|---|
| Charge 1 Mix | 2 minutes (255° F.); | Rotor Speed: 60 |
| Charge 2 Mix | 1 minute (280° F.); | Rotor Speed: 105 |
| Charge 3 Mix | to 340° F. minimum; | Rotor Speed: 60 |

As in Example 1, the mill mix was milled on a two-roll mill and the resulting adhesive material was then calendered onto a 9.0 mil thick polyethylene backing to provide an adhesive layer 7.0 mils thick. The resulting tape was identified as X-97061.

EXAMPLE 3

Example 2 was repeated except for substituting 3 lbs. of Escorez 1315 for the 3 lbs. of Escorez 1102/Piccopale 100 in Banbury Charge 3 and 50 lbs. of Escorez 1315 for the 50 lbs. of Escorez 1102/Piccopale in the mill mix of Example 2 (making a total substitution of 53 lbs. of Escorez 1102); and except for the following temperature changes in making the three-charge Banbury mix:

Charge 1: 250° F.
Charge 2: 270° F.
Charge 3: to 330° F. minimum.

The resulting tape was identified as identified as X-97062.

EXAMPLE 4

Analytical Data

The three tapes of Examples 1–3 were tested for comparison with the Polyken 2036-25 high shear tape (commercially available from the Polyken Technologies Division of The Kendall Company and sold for use on metal pipe with continuous operating temperatures up to 200° F.), using the Polyken 2027 Primer recommended by the manufacturer for use with this tape.

All test samples were prepared in the same manner. The primer (Renfrew 319 primer for the test samples of Examples 1–3) and the above-mentioned Polyken 2027 primer (for the control Polyken 2036-25 commercial high shear tape) were applied to steel plates. After drying, the tape samples were applied to the primed surface of the steel plates and rolled with a 4.5 pound roller to assure that any air bubbles were eliminated. The samples were then conditioned for 48 hours at the same temperature at which they were later tested for shear, 70° F. (21° C.); 135° F. (57.2° C.); 145° F. (62.7° C.); 155° F. 165° F. (73.8° C.); or 175° F. (79.4° C.), under a dead weight to assure maximum surface contact. [These conditions approximate the condition of the tapes when actually applied under field conditions.] The samples were then tested for resistance to shear using an Instron testing device set to move at one mm per minute. The Instron records the maximum force the sample will withstand before movement (failure).

The test results are set forth in the following Table.

TABLE OF TEST RESULTS
(ounces/inch at test temperature)

| Sample | 70° F. | 135° F. | 145° F. | 155° F. | 165° F. | 175° F. |
|---|---|---|---|---|---|---|
| Polyken 2036-25 | 240 | 83 | 70 | 71 | 43 | 23 |
| X-97046 | 212 | 94 | 93 | 81 | 68 | 74 |
| X-97061 | 343 | 139 | 123 | 122 | 106 | 91 |
| X-97062 | 441 | 155 | 142 | 112 | 113 | 88 |

From the test data in the above Table it will be readily apparent that the three samples of the present invention outperformed the Polyken control high shear tape across the board at all temperatures, except for the 70° F. test of the X-97046 sample. While it is not entirely clear why the '046 sample's resistance to shear was slightly lower at this temperature, it is pointed out that the resistance to shear at the recited higher temperatures is what is more critical in the performance of pipeline tapes.

It will also be noted that while the '046 sample outperformed the Polyken control sample, it itself was dramatically outperformed by the '061 and '062 test samples.

This was as anticipated and is readily explained.

With reference to Examples 1–3, it will be seen that the '046 sample (Example 1) does not contain any crosslinked halogenated butyl rubber, the invention of the parent case, while the '061 and '062 samples of Examples 2 and 3, respectively do contain crosslinked halogenated butyl. Accordingly, the '046 sample predictably did not perform as well as the latter two samples embodying the invention of the parent case. However, it is stressed that the '046 sample did outperform the Polyken sample.

From Examples 1–3 two very significant aspects of the present invention can be observed.

First, although the invention of the parent application provides a very significant technical advancement in the art, the results obtainable by the practice of the invention in the parent case can be increased still further by the invention of the instant application by including a block polymer of the present invention in the rubber mix of the parent case containing crosslinked halogenated butyl rubber in the mix.

Secondly, while the present invention was directed initially to an R&D effort to optimize the shear resistance of the parent case, it was found unexpectedly that the present invention stands on its own feet, so to speak, in that it is independent from the limitations of the parent case, providing a technical advance in the art without the benefit of including the halogenated butyl as taught in the parent case.

To recapitulate, an important feature of the present invention is the improvement provided in shear resistance obtainable over that afforded by the invention of the parent application, now U.S. Pat. No. 5,817,413, by incorporating in the rubber mix the recited block polymer. As described earlier, the block polymers of the present invention melt at temperatures of 200° F. or higher, at which temperature they begin to act as a plasticizer. Consequently, the rubber mix will possess decreased viscosity at these elevated temperatures, thereby permitting the rubber mix to have increased crosslinks while at the same time being calendered onto the tape backing during the manufacturing process. When the temperature is permitted to cool down after calendering, the block polymer forms long, tangled molecular chains which cause high resistance to distortion at all temperatures below 200° F.

Although the present invention has been described in terms of its intended use as a pipewrap for inground pipes, the uses for the tapes of this invention are not so limited. The present invention is also useful, for example, in providing resistance to shear for pipes above the ground as well as those in the ground.

It will be appreciated that various changes may be made without departing from the scope of the invention herein contemplated. Accordingly, the foregoing description including the examples shall be taken as being illustrative and not in a limiting sense.

What is claimed is:

1. In a high shear adhesive tape comprising a backing material carrying on one surface thereof a rubber-based adhesive layer containing a rubber mix and at least one tackifying resin, the rubber mix including an effective amount of a crosslinked halogenated butyl rubber, the remaining rubber in the mix being non-crosslinked, the adhesive layer further being characterized as being free of any crosslinking agent for the remaining rubber in the mix;

the improvement wherein the rubber mix further includes a styrenic block copolymer or terpolymer in an amount effective to produce a still further detectable improvement in shear resistance.

2. A high shear adhesive tape as defined in claim 1 wherein the rubber mix contains up to about 45 percent by weight of crosslinked halogenated butyl rubber, based on the total weight of rubber in the adhesive layer.

3. A high shear adhesive tape as defined in claim 1 wherein the remaining rubber in the mix is butyl rubber.

4. A high shear adhesive tape as defined in claim 3 wherein the butyl rubber comprises a mixture of reclaimed butyl rubber and virgin butyl rubber.

5. A high shear adhesive tape as defined in claim 1 wherein the block polymer is a terpolymer.

6. A high shear adhesive tape as defined in claim 5 wherein the terpolymer is selected from the group consisting of SIS, SBS or SEBS.

7. A high shear adhesive tape as defined in claim 1 wherein the block polymer comprises from about 10 percent to about 40 percent by weight of the total weight of rubber in the rubber mix.

8. A high shear adhesive tape as defined in claim 1 wherein the rubber in the mix in the adhesive layer consists essentially of from about 20 to about 45 percent by weight of crosslinked halogenated butyl rubber; from about 35 to bout 70 percent by weight of non-crosslinked butyl or other rubber; and from about 10 to about 40 percent by weight of the styrenic block copolymer or terpolymer, based on the total weight of rubber in the adhesive layer.

9. A high shear adhesive tape as defined in claim 1 wherein the backing material comprises an impact-resistant polymeric material.

10. In a protective pipewrap system comprising, in combination, a primer coating adapted for coating the outer surface of a pipe; and a high shear adhesive tape adapted to be wound over the primer coating on the pipe's surface, the adhesive tape comprising a backing material carrying on one surface thereof a rubber-based adhesive layer containing a rubber mix and at least one tackifier agent, the rubber mix including an effective amount of a crosslinked halogenated butyl rubber, the remaining rubber in the mix being non-crosslinked, the adhesive layer further being characterized as being free of any crosslinking agent for the remaining rubber in the mix and the primer coating also being free of any crosslinking agent for the remaining rubber in the mix;

the improvement wherein the rubber mix further includes an effective amount of a styrenic block copolymer or terpolymer.

11. A protective pipewrap system as defined in claim 10 wherein the rubber mix contains up to about 45 percent by weight of crosslinked halogenated butyl rubber, based on the total weight of rubber in the adhesive layer.

12. A protective pipewrap system as defined in claim 10 wherein the remaining rubber in the mix is butyl rubber.

13. A protective pipewrap system as defined in claim 12 wherein the butyl rubber comprises a mixture of reclaimed butyl rubber and virgin butyl rubber.

14. A protective pipewrap system as defined in claim 10 wherein the block polymer is a terpolymer.

15. A protective pipewrap system as defined in claim 14 wherein the terpolymer is selected from the group consisting of SIS, SBS or SEBS.

16. A protective pipewrap system as defined in claim 10 wherein the block polymer comprises from about 10 percent to about 40 percent by weight of the total weight of rubber in the rubber mix.

17. A protective pipewrap system as defined in claim 10 wherein the rubber in the mix in the adhesive layer consists essentially of from about 20 to about 45 percent by weight of crosslinked halogenated butyl rubber; from about 35 to about 70 percent by weight of non-crosslinked butyl or other rubber; and from about 10 to 40 percent by weight of the styrenic block polymer, based on the total weight of rubber in the adhesive layer.

18. A protective pipewrap system as defined in claim 10 wherein the backing material comprises an impact-resistant polymeric material.

19. A protective pipewrap system as defined in claim 10 wherein the primer coating comprises at least one rubber and a tackifying resin .

20. A protective pipewrap system as defined in claim 14 wherein the primer coating comprises at least one rubber and a tackifying resin.

21. An article of manufacture comprising a metal pipe; and a protective pipewrap system as defined in claim 10 covering the outer surface of the pipe.

* * * * *